UNITED STATES PATENT OFFICE.

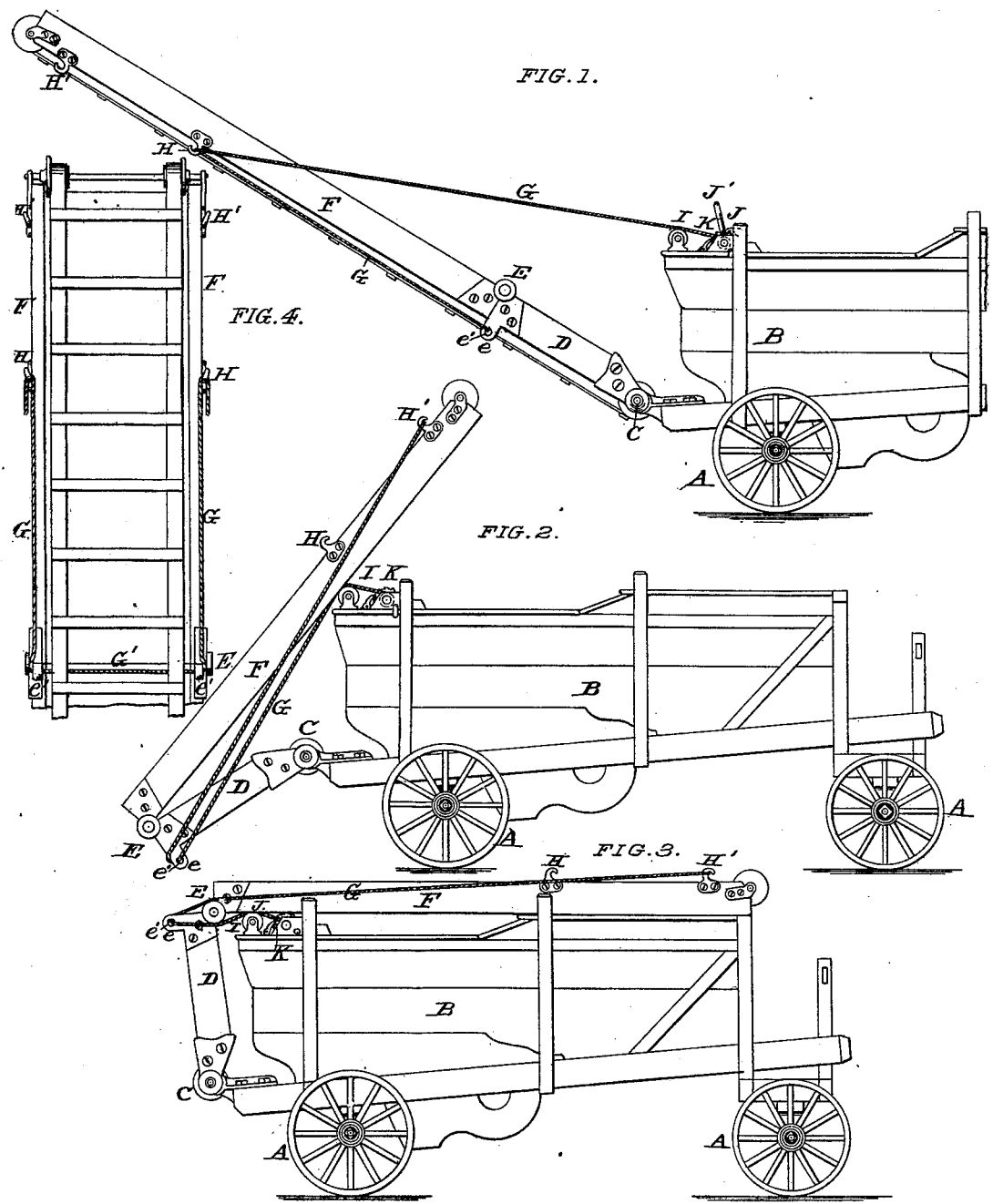

WILLIAM S. REEDER, OF ST. LOUIS, MISSOURI.

IMPROVEMENT IN STRAW-CARRIERS FOR GRAIN-SEPARATORS.

Specification forming part of Letters Patent No. 213,935, dated April 1, 1879; application filed December 19, 1878.

*To all whom it may concern:*

Be it known that I, WILLIAM S. REEDER, of the city of St. Louis, in the State of Missouri, have invented a certain new and useful Improvement in Straw-Carriers for Grain-Separators, of which the following is a full, clear, and exact description, reference being had to the accompanying drawings, forming part of this specification.

My improvement relates to a straw-carrier constructed to be folded back upon the top of the machine when not in use; and my invention consists in the hereinafter-described construction of the straw-carrier and appliance for loading it upon the top of the machine.

In the drawings, Figure 1 is a side elevation showing the straw-carrier in its operating position. Fig. 2 is a side elevation showing the straw-carrier in the act of being loaded upon the machine. Fig. 3 is a similar view, showing the straw-carrier loaded, putting the machine in condition for removal from place to place. Fig. 4 is a bottom view of the straw-carrier.

I claim in this application no improvement on the body of the machine except as to the appliance for holding and operating the straw-carrier, and consequently shall not burden the specification with any description of the body proper further than has necessary connection with the straw-carrier.

The wheels are shown at A and the body at B. C is a hinge, of which there is one upon each side, bracketed to the rear ends of the body-sills. The other members of the hinges C are attached to the forward ends of the shorter side bars, D, of the straw-carrier. The other ends of these bars D are connected by rule-joints E at each side of the ends of the side bars F. The lower member of each of the hinges E has a downwardly-projecting arm, e, having an eye, e', through which passes the supporting cord or chain G. This cord extends through both of the eyes e', then around hooks H or H' upon the lower sides of the bars F, and then upon both sides to the rear end of the body, passing over the roller I to the windlass J, which is turned by a handle, J', to take up or let out the cord in raising or lowering the straw-carrier upon the hinges C. The windlass may have any form of dog to prevent the unwinding of the rope. I have shown an ordinary ratchet-wheel and pawl, K.

I will now describe the manner of operating and advantages of my apparatus.

Suppose the straw-carrier to be in the working condition, as shown in Fig. 1, and it is desired to fold it upon the machine, as seen in Fig. 3. The rope may be first let out, so as to lower the carrier to some extent. Then the hinges E are bent downward and fall to the earth or to an object placed to receive them. The descent of the hinges causes the free end of the straw-carrier to rise and move toward the body of the machine, and this end is then bent over on the hinges E upon the roller I, as shown in Fig. 2. The rope G is then disconnected from the hooks H, and the part G', between the arms e, is drawn up and engaged upon the pair of hooks H or H'. Then the windlass is turned to coil the ends of the rope G upon it, and the carrier is drawn by the cord into the position shown in Fig. 3, and the machine is in condition for moving from place to place.

To put it into the working position, the dog or pawl is disengaged from the windlass, so as to allow the uncoiling of the rope, and the free end of the straw-carrier is lifted, and it is pushed back upon the roller I until it reaches the position shown in Fig. 2. Then the cord is disengaged from hooks H' and its sides carried directly from the windlass and engaged upon the hooks H. Then the free end is swung over and down until it lies flat upon the ground, or nearly so, and the hinges E being straightened up, the carrier is raised by the rope and windlass into the position shown in Fig. 1.

It will be seen that the pivot of the rule-hinges is at the top of the side bars D and F, and that the rope G, being connected to the downwardly-extending arms e, will prevent the downward flexure of the hinges.

I have shown a single guy-rope, G, but it is obvious that there might be two of these ropes, one upon each side, and in this case the outer end of each side rope would be connected to the arm e' when the parts should be in working position, as in Fig. 1, and the rope would pass through hooks H, as shown. When the parts were in the position shown in Fig. 3, the ends of the side ropes would be connected with hooks H or H', and the rope would be engaged with the arms e between the ends. When the side ropes are made separate, as above, the arms e may be furnished with suitable hooks in place of eyes e', to allow the easy disengagement of the ropes.

I claim as my improvement—

1. The straw-carrier provided with hooks H, and having downwardly-bending rule-joints E, with downwardly-projecting arms e, in combination with the guy-rope G, engaging with the arms and hooks and passing over the roller and windlass, as set forth.

2. The combination, with the body B and rope G, of the straw-carrier having downwardly-bending rule-joints E and downwardly-projecting arms e, and hooks or eyes H, for the engagement of the rope, for the described purpose.

WILLIAM S. REEDER.

Witnesses:
  SAML. KNIGHT,
  GEO. H. KNIGHT.